United States Patent [19]

Sciaky et al.

[11] Patent Number: 4,654,505
[45] Date of Patent: Mar. 31, 1987

[54] MULTI-POINT LASER BEAM WELDING INSTALLATION FOR VEHICLE BODIES

[75] Inventors: Mario Sciaky, Paris; Roland Cazes, St. Maur; Georges Sayegh, Paris, all of France

[73] Assignee: Sciaky S.A., Quai Jules Guesde, France

[21] Appl. No.: 626,497

[22] Filed: Jun. 29, 1984

[30] Foreign Application Priority Data

Jul. 27, 1983 [FR] France ................................ 83 12441

[51] Int. Cl.⁴ ............................................. B23K 27/00
[52] U.S. Cl. ......................... 219/121 LC; 219/121 LS; 219/85 BA; 228/182
[58] Field of Search ................. 219/121 LC, 121 LD, 219/121 LS, 121 LQ, 121 LM, 121 LY, 121 LT, 121 LK, 121 LL, 121 L, 85 BA, 86.23; 228/178, 182, 183

[56] References Cited

U.S. PATENT DOCUMENTS

| | | | |
|---|---|---|---|
| 4,000,392 | 12/1976 | Banas et al. | 219/121 LC |
| 4,128,753 | 12/1978 | Sharp | 219/121 LC |
| 4,135,077 | 1/1979 | Wills | 219/121 LS X |
| 4,322,600 | 3/1982 | Crahay | 219/121 LS X |
| 4,367,017 | 1/1983 | Jimbou et al. | 219/121 LQ |
| 4,379,219 | 4/1983 | Behrens et al. | 219/121 LC |

Primary Examiner—Philip H. Leung
Attorney, Agent, or Firm—Seidel, Gonda, Goldhammer & Abbott

[57] ABSTRACT

A multi-point laser welding installation for vehicle bodies includes apparatus for positioning the pieces to be welded, apparatus for gripping the pieces and apparatus for welding the positioned and gripped pieces at specific points. The apparatus for positioning and gripping are provided with bearing surfaces. The shape of these surfaces conforms to the shape of the pieces. The apparatus for positioning and gripping include cavity which open the pieces at right angles. The welding apparatus is fixed on the positioning and/or gripping apparatus in order to ensure spot welding of the pieces at right angles to the cavities.

4 Claims, 13 Drawing Figures

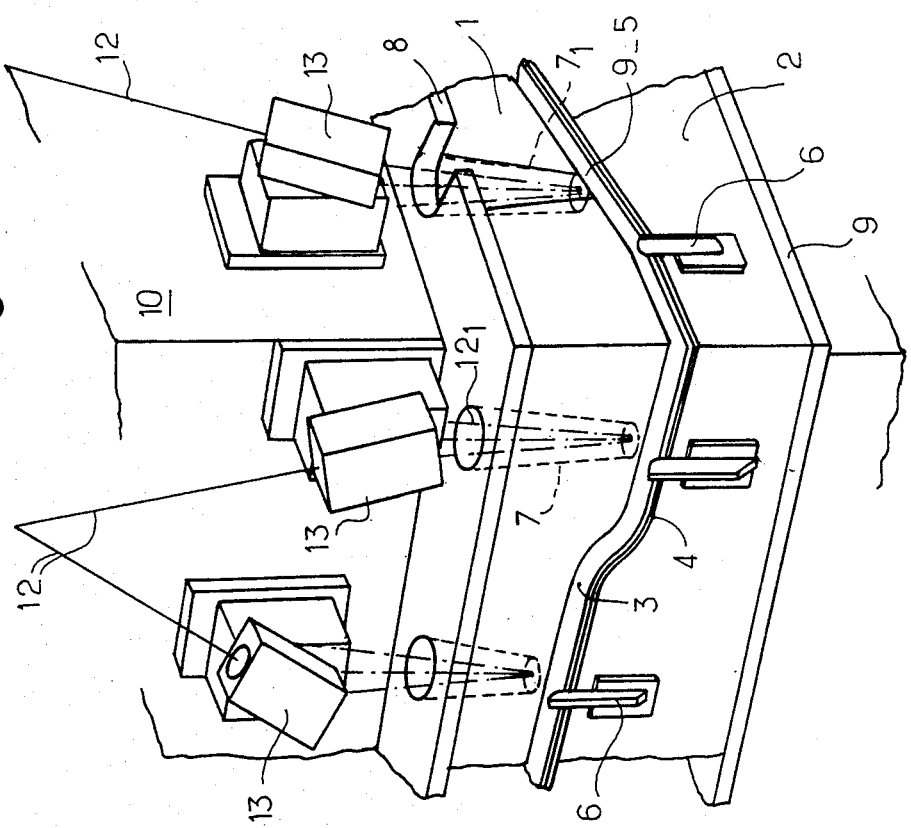
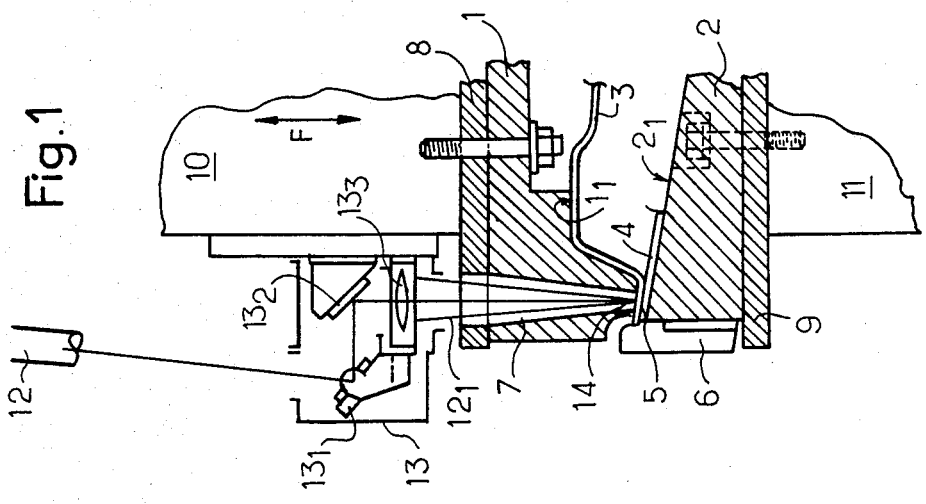

MULTI-POINT LASER BEAM WELDING INSTALLATION FOR VEHICLE BODIES

The invention relates to a multi-point welding installation particularly for motor vehicle bodies.

The inter se assembly of sheet metal parts of motor vehicle bodies is carried out on multi-point machines which are currently conventional and which employ resistance welding.

Such assembly requires to be carried out in a machine which comprises essentially several shaping elements, the form of which is, for each of them, adapted to a specific zone of the pieces which are to be assembled and the function of which is to ensure positioning of the pieces in relation to one another and in relation to the mobile welding heads and also to grip the said pieces, that is to say to ensure the correct geometry of the assembly at the moment the weld is made.

Then, during the actual welding, the mobile welding elements interpose their respective working heads between the free zones left between the shaping elements and the whole arrangement gives rise to what it is agreed should be called a welding tool specific for the pieces which are to be assembled.

Such a tool necessarily comprises two paired parts, of which one is active and the other reactive, which open to allow introduction of the pieces prior to welding, close again closely to position the pieces and grip them, and permit of the welding operations, then open again so that the pieces can be extracted.

However, spot-welding tools are complicated and require long hours of study, manufacture, adjustment etc. The use of robots in order to render the assembly operations less specific and more flexible only partially resolves the problem.

Indeed, in contrast to a multi-point installation where all the welding points can be performed simultaneously, giving rise to a short working time, the use of one or a plurality of robots encounters three essential difficulties:
  the time required for movement from one position to the next of the welding tool which is robot-operated is considerable;
  the presence of gripping elements and elements for positioning the pieces complicates and extends the time required to position the tool at right angles to each welding point and
  often it is impossible from the physical point of view to employ several robots in order to reduce the working time of each of them.

The principle object of the present invention is to remedy these drawbacks and to this end it relates to a multipoint welding installations, particularly for motor vehicle bodies, the said installation comprising means of positioning the pieces to be welded, one in relation to the other, means of gripping these pieces and means of welding the positioned and gripped pieces at specific points on these pieces, said positioning and gripping means being provided with bearing surfaces, the shape of which is adapted to the shape of the pieces, the said installation being characterised in that at least certain of the positioning and/or gripping means have cavities discharging onto the bearing surfaces at right angles to the pieces and in that the welding means are fixed on these positioning and/or gripping means to ensure spot-welding of these pieces at right angles to the cavities.

According to a further feature of the invention, the positioning means are constituted by a punch and a die, the shape of which, for each of them, corresponds to at least one part of of one of the pieces to welded, these positioning means likewise constituting the means of gripping the pieces.

According to a further characteristic feature of the invention, the cavities and the welding means for provided on one of the punches or dies.

According to another characteristic feature of the invention, the welding means consists of laser beam welding heads fixed to the positioning and/or gripping means, at a right angles to the cavities.

According to another characteristic feature of the invention, a plurality of laser beam welding heads, providing for focusing of the laser beam on the pieces, are fixed on one and the same positioning and/or gripping means at a right angle to the cavities, the said heads being supplied by one and the same laser beam source, laser beam distributing means being provided between the source and the said heads in order orientate the laser beam successively towards each of these heads when the pieces are positioned and gripped by these means, in order successively to spot-weld these pieces at the level of the cavities.

By way of non-limitative example, the invention is illustrated in the accompanying drawings, in which:

FIG. 1 is a partial diagrammatic cross-sectional view through an installation according to the invention;

FIG. 2 is a partial perspective view of the installation shown in FIG. 1;

Figure 3:
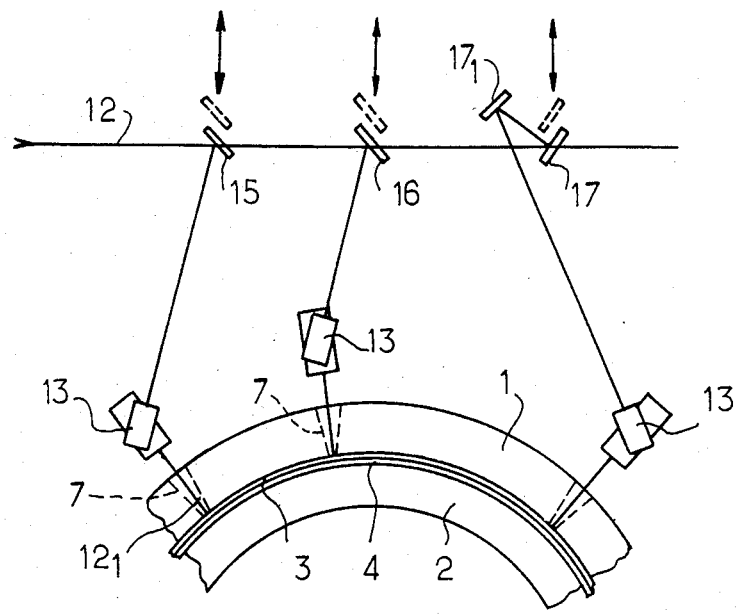
Figure 4:
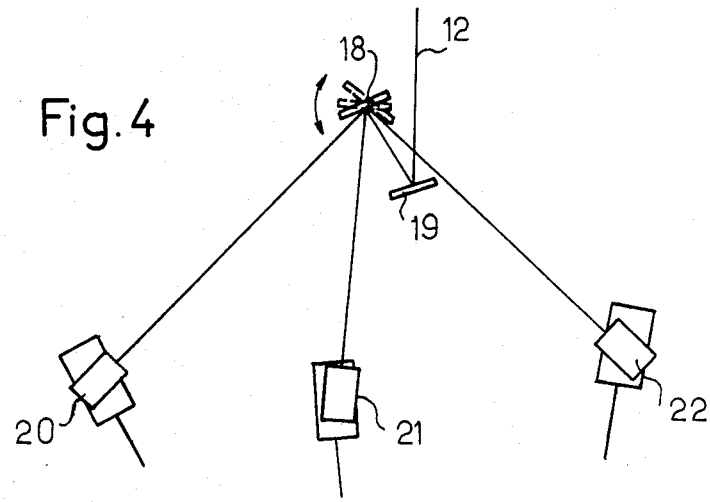
Figure 5:
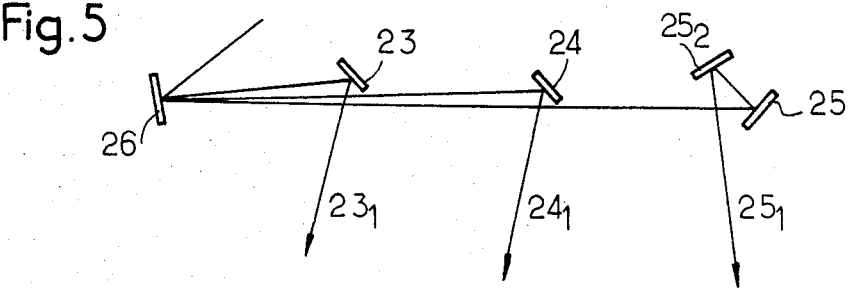
Figure 6:
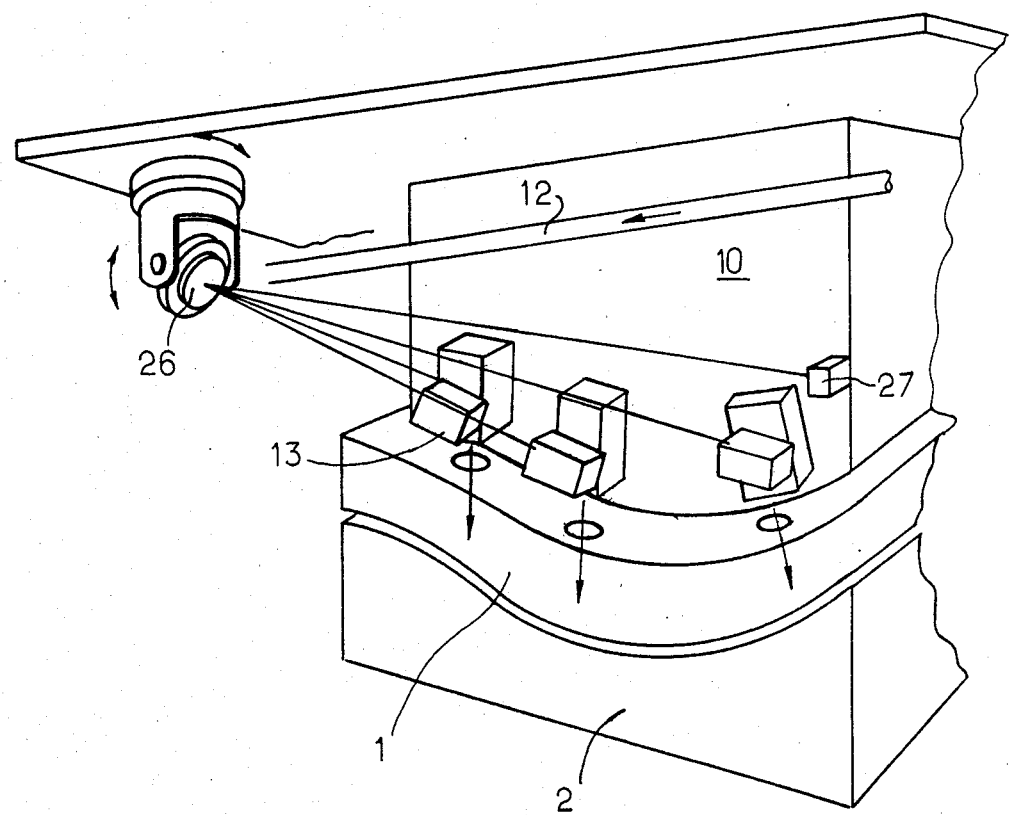
Figure 7:
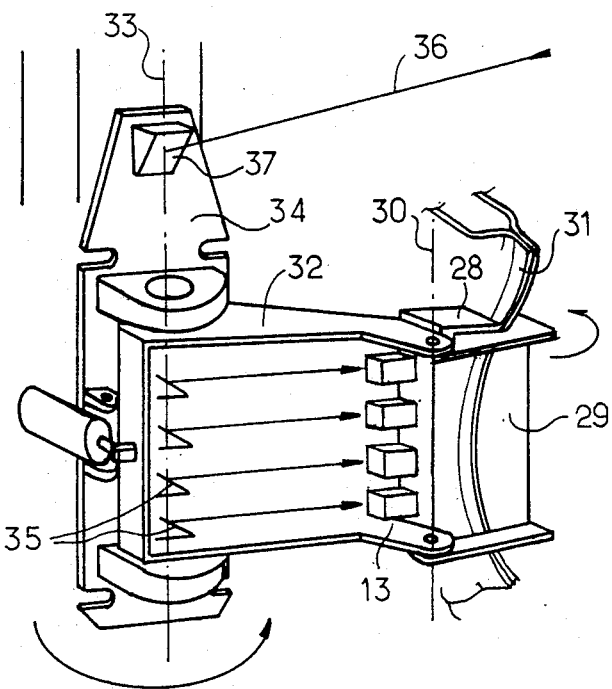
Figure 8:
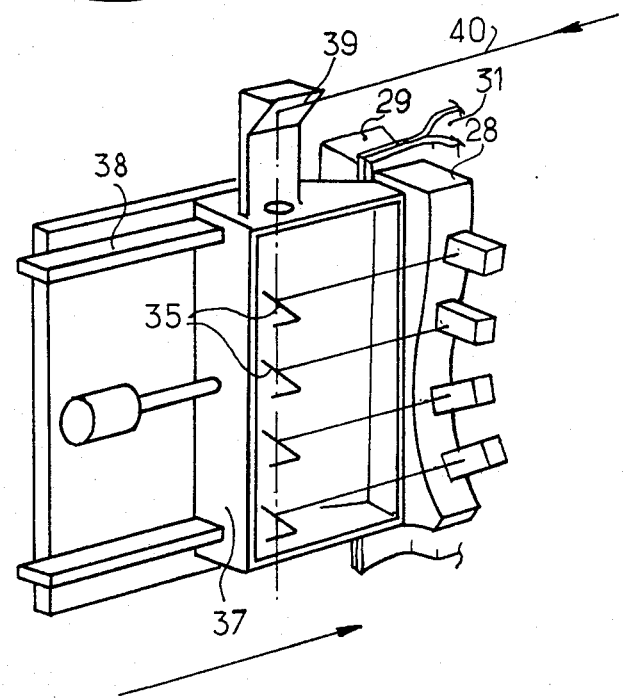
Figure 9:
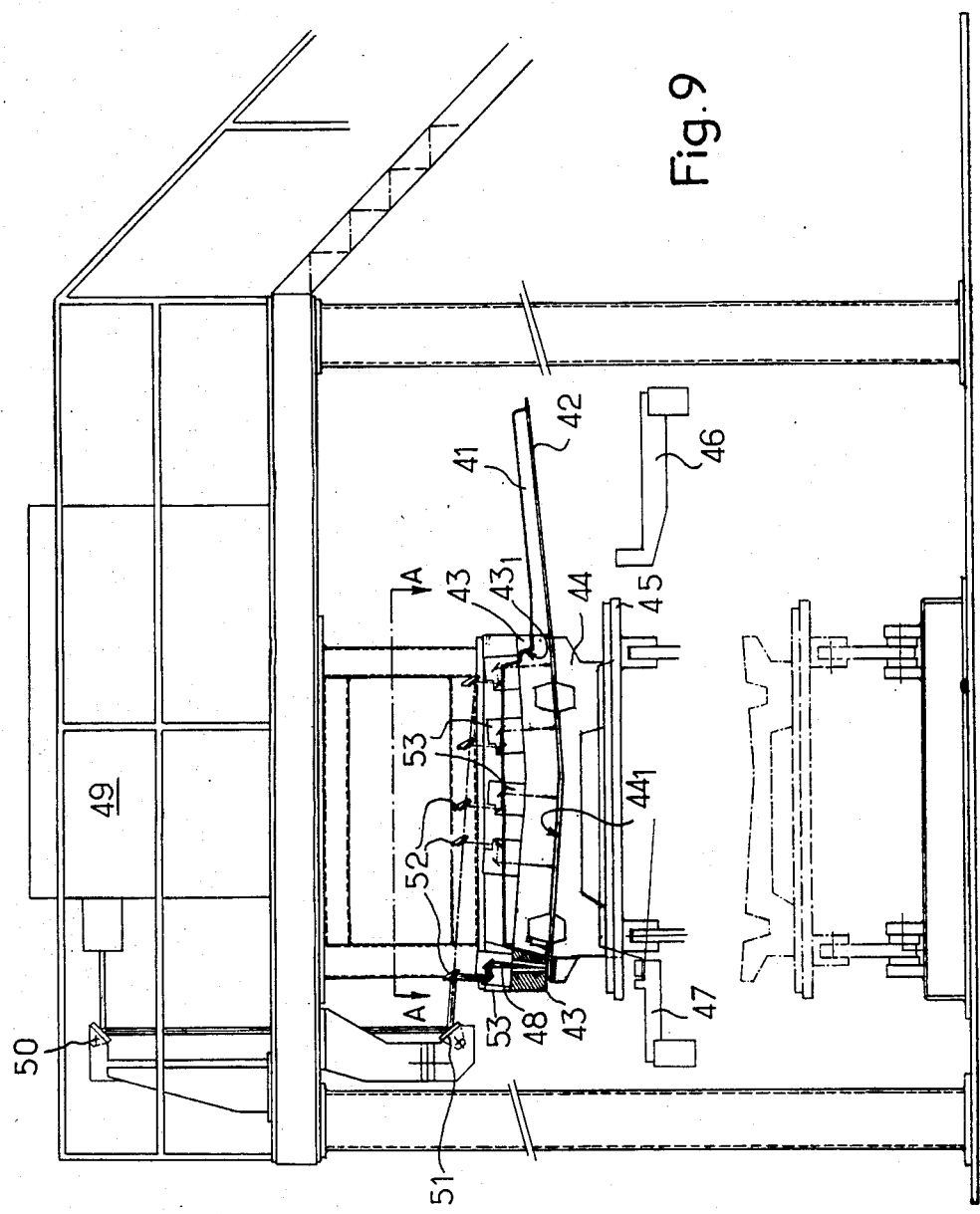
Figure 10:
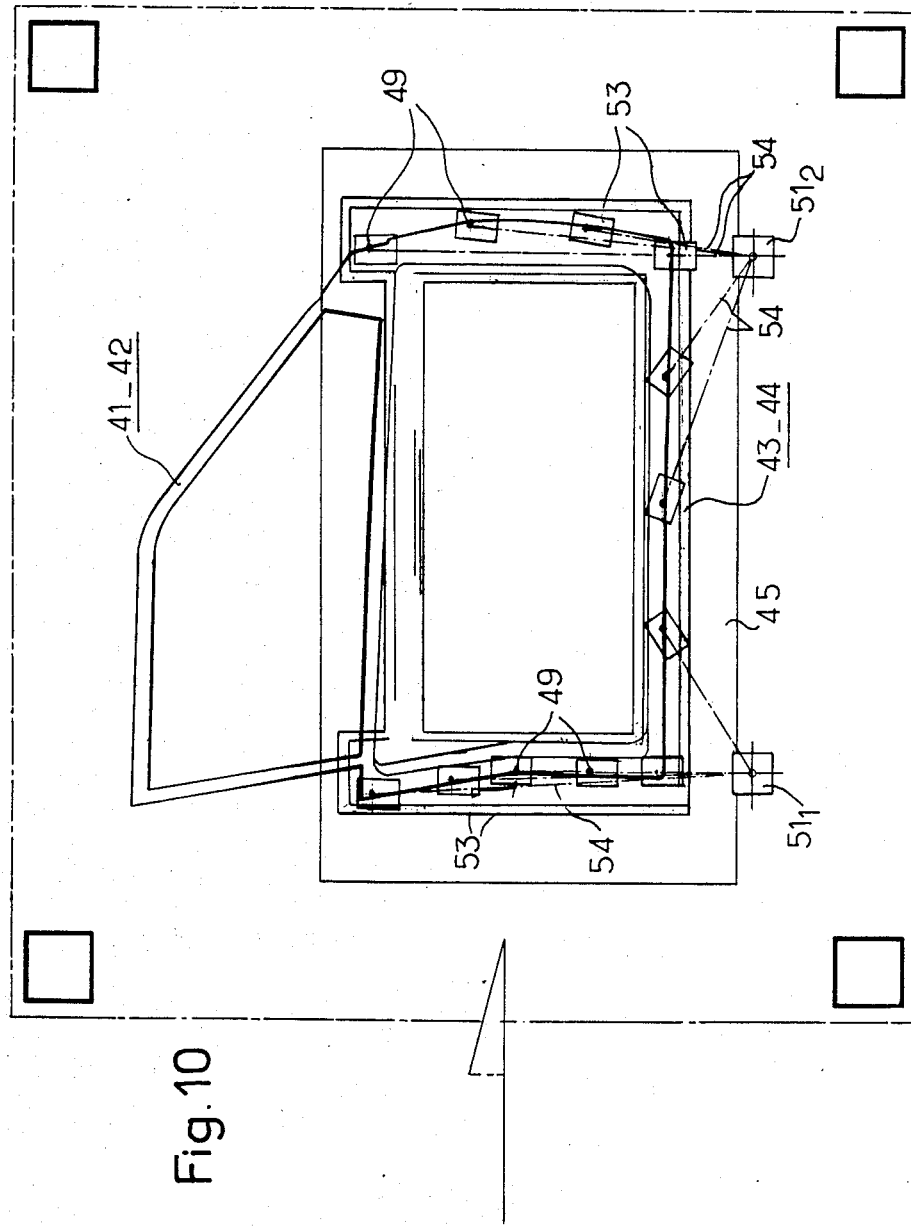
Figure 11:
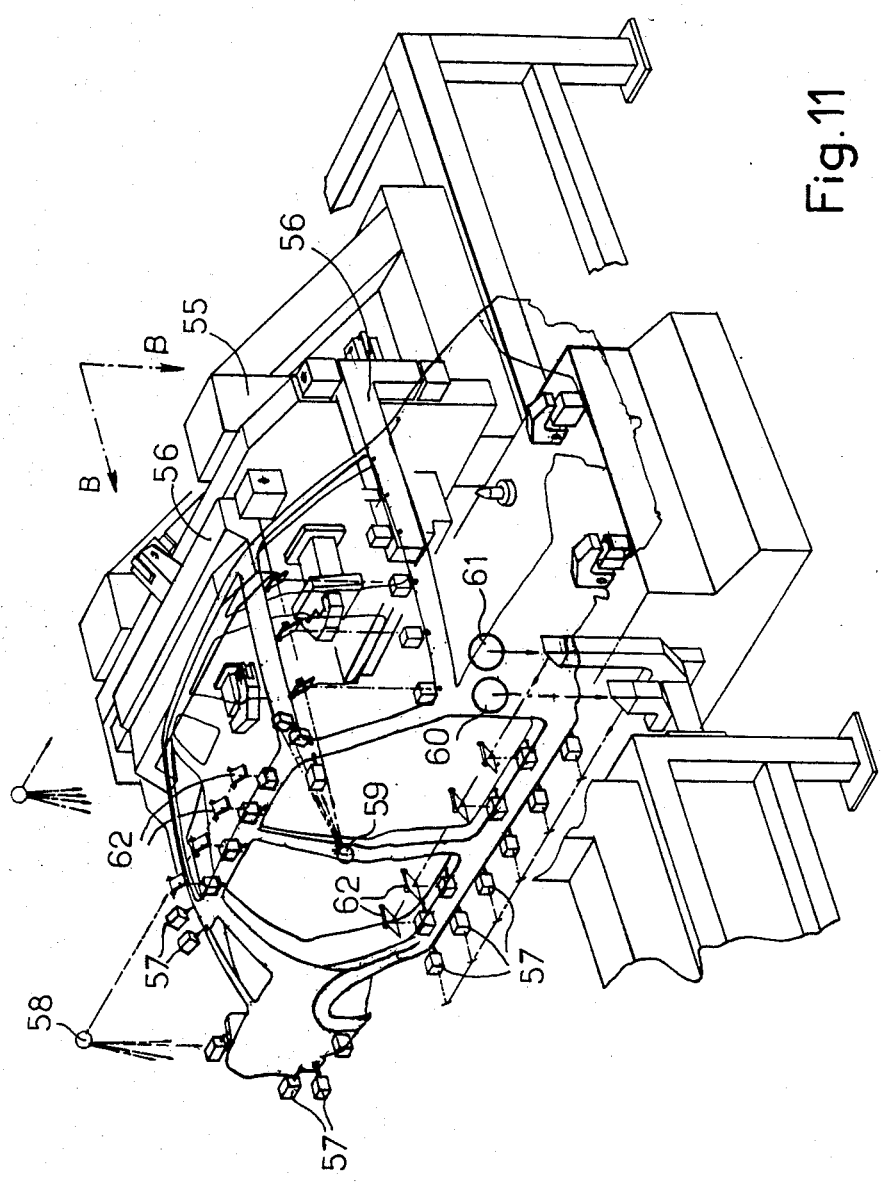
Figure 12:
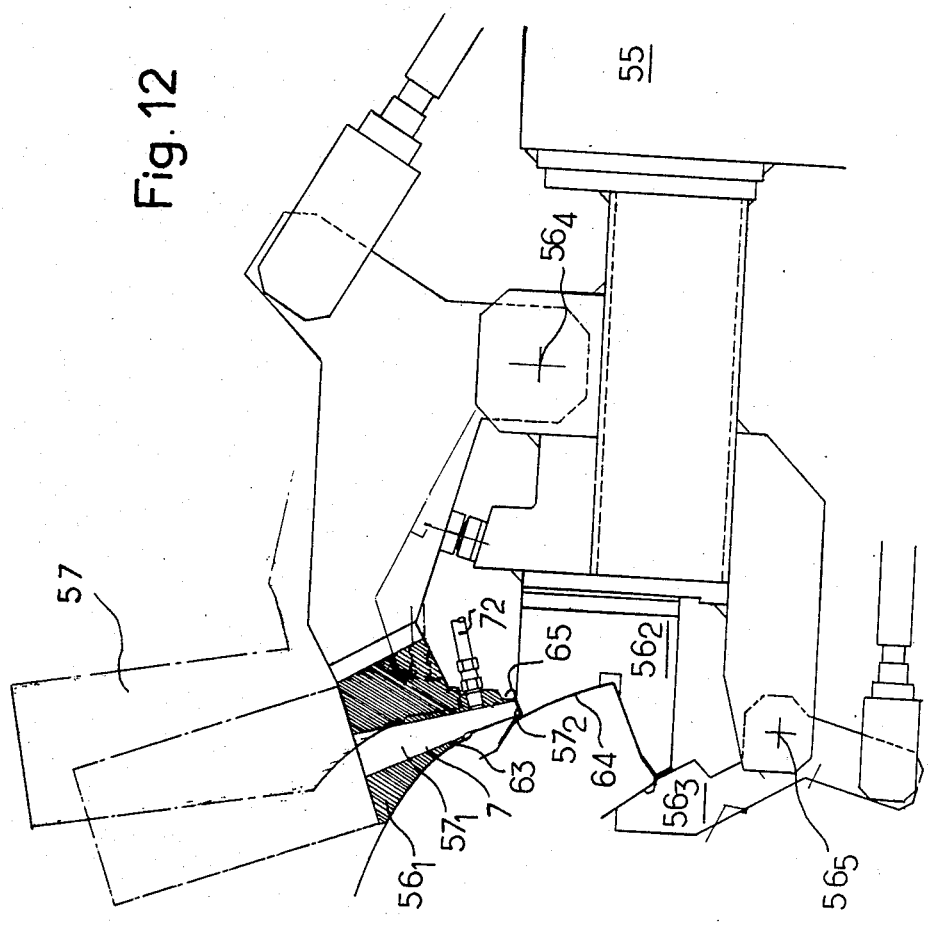
Figure 13:
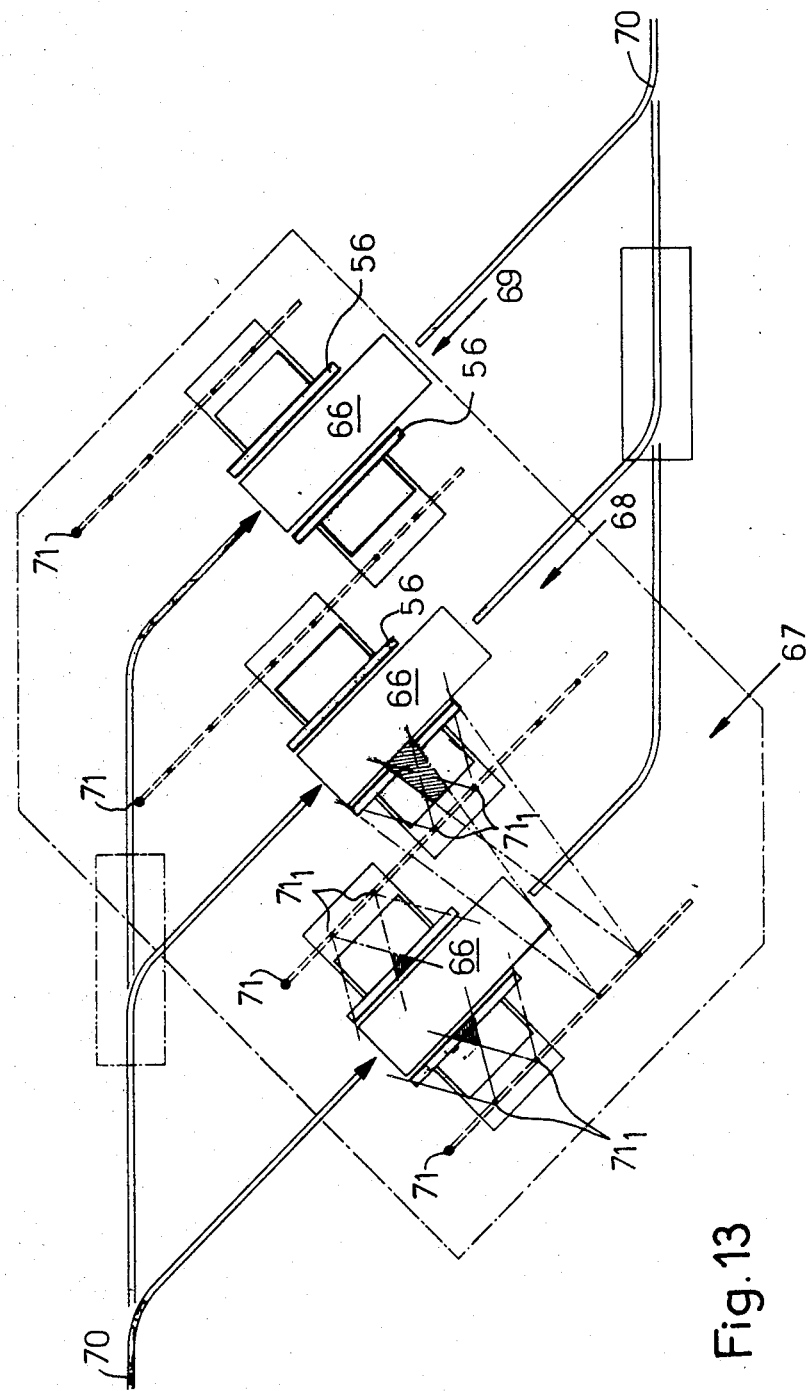

FIGS. 3, 4 and 5 diagrammatically show three methods of distribution of a lasar beam towards the welding heads;

FIG. 6 is a diagrammatic perspective view of an embodiment of laser beam distribution employing a pivoting mirror;

FIGS. 7 and 8 show in diagrammatic perspective two examples of a laser beam distribution arrangement having a plurality of aligned mirrors;

FIG. 9 is a partial lateral section through a multi-point welding installation used for welding a motor vehicle door;

FIG. 10 is a diagrammatic view taken on the line A—A in FIG. 9;

FIG. 11 is a perspective view of an installation according to the invention for the indentation or welding of fixed elements of a motor vehicle motor body;

FIG. 12 is a partial section taken on the line B—B in FIG. 11;

FIG. 13 is an elevational view showing an installation according to the invention for simultaneous welding of three identical or different models of body disposed in in a single transfer line.

According to the example of embodiment shown in FIG. 1, the installation comprises positioning and gripping means which are constituted by a punch 1 and a die 2, each movable in relation to the other for positioning and gripping the two pieces 3 and 4 which are to be welded, the facing surfaces $1_1$ and $2_1$ of the said punch and die being to this end constructed in the shape of the pieces 3 and 4 in order to position these latter one in relation to the other and in order to grip them at their periphery, one against the other at 5.

In the example illustrated, the die 2 likewise comprises laterally disposed stays 6 which co-operate in positioning the pieces.

In the example shown, the punch 1 and the die 2, made from metallic or other materials such as plastics or composite materials, constitute the only elements for positioning and gripping the pieces 3 and 4 and the face of the bearing surfaces $1_1$ and $2_1$ can therefore be easily and directly obtained by machining with the aid of a computer into which the shape of the pieces 3 and 4 which are to be assembled is fed in data form.

In the example shown, the punch 1 comprises cavities 7 made in the form of orifices which traverse the punch from side to side and which open out onto the bearing surfaces $1_1$ adapted to the shape of the piece 3 and at the height of the zone 5 for gripping of the two pieces 3 and 4, one against the other.

As will be explained hereinafter, this cavity 7 will make it possible to carry out the spot-weld at 5 but it will be noted straight away that the position of this cavity 7 which determines the position of the spot-weld may easily be determined by using the computer at the time the punch is being machined and is therefore directly positioned in relation to this punch and more particularly in relation to its bearing surface $1_1$.

The punch and die 1, 2 are fixed on plates 8, 9 associated with the uprights 10, 11 of a welding press, these uprights being adapted for movement one in relation to the other in the direction F in order to move apart the punch and die 1,2 to allow positioning of the pieces 3 and 4 and in order to be able to bring the punch and die closer to each other for positioning and gripping of the pieces 3, 4 one against the other and in order to carry out the spot-welding operation.

This welding operation is carried out by means of a laser beam 12 emanating from a generator, now shown, and which enters the welding head 13 fixed to the upright 10 and therefore to the punch 1, said welding head 13 providing for focusing of the emerging laser beam $12_1$ at 14 on the zone 5 of the superposed pieces 3 and 4.

It will be noted that this combination of means will permit of rapid precise positioning of the welding head 13 so that the latter can carry out the desired spot-weld at 5 since the pieces 3, 4 are positioned in relation to the punch and die 1, 2 and therefore in relation to the cavity 7 and the welding head 13 which is fixed in relation to the punch 1.

In the example shown, the welding head 13 comprises a first pivoting and therefore regulable mirror $13_1$ which returns the laser beam 12 onto a fixed mirror $13_2$ then to a focusing means constituted by a lens $13_3$.

According to FIG. 2, it will be seen that the assembly comprising punch 1, plate 8 and upright 10 supports three welding heads 13 for focusing the incident laser beam 12, this beam originating either from one and the same laser beam generator or from different generators.

These welding heads 13 are orientated as a function of the incident laser beam in order to project the focused emergent beam $12_1$ through the cavity 7.

According to the position of the spot-weld to be made on the pieces and according to the more or less complex form of the punch and die 1, 2, the cavity allowing passage of the laser beam may be made in the form of a lateral recess as shown at $7_1$ instead of constituting a cavity 7 formed entirely within the punch 1.

Likewise, if this is possible, having regard to the form of the pieces and the position at which the spot-welds are desired, so the punch may be withdrawn from the periphery of the pieces and the laser beam issuing from the fixed heads will pass along the lateral edge of the punch or die in order to be focused into the recess formed by the space between the edge of the pieces and the edge of the punch.

In view of the fact that the welding positions 13 occupy a fixed location in relation to the positioning and gripping means constituted by the punch 1 and the die 2 and in relation to the cavities 7 allowing passage of the laser beam, the said welding positions which are fixed in relation to one another being capable of being successively supplied by a laser beam issuing from one and the same generator.

Thus, according to FIG. 3, the incident laser beam 12 is carried over a distribution assembly comprising mirrors 15, 16 and 17 which are capable of being placed in succession in the path of the beam 12 so that each can return the laser beam to a given welding position 13. This mirror can either directly reflect the beam onto its welding position 13 as is the case for the mirrors 15 and 16 or in contrast may reflect it to an intermediate mirror $17_1$, as is the case with the mirror 17, this as a function of the orientation of the incident beam 12 and the position of the welding head 13 in question.

In the embodiment shown in FIG. 4, on the other hand, only one mirror 18 is provided which receives the incident beam 12, for example after it has been reflected by an intermediate mirror 19, the mirror 18 being successively positioned angularly in order to reflect the laser beam in succession to the welding positions 20, 21 and 22.

In the embodiment shown in FIG. 5, the distribution assembly is composed of three mirrors 23, 24 and 25 which are slightly staggered in relation to one another and which successively receive the laser beam reflected by a mirror 26 pivoting in the directions $23_1$, $24_1$, $25_1$ each of which corresponds to a welding position. In this embodiment, the pivoting angle of the mirror 26 is small having regard to the offset of the fixed mirrors 23, 24, 25, one or more of these mirrors being likewise capable of returning the reflected beam to an intermediate mirror as shown at $25_2$ in the said FIG. 5.

According to FIG. 6, this shows in perspective view an installation of which the welding heads 13 fixed to the upright 10 of the punch 1 successively receive the laser beam 12 after it has been reflected by a mirror 26 which is adapted to pivot about two orthogonal axes driven by motors operated by a computer program.

In this case, the upright 10 preferably comprises a target 27, of which the positioning space is determined in relation to the welding heads 13, the said position being fed into the computer so that the mirror 26 can make use of this target 27 as a reference and orientate itself suitably and successively at the various welding positions 13.

In the embodiment shown in FIG. 7, the welding heads 13 are fixed on a positioning and gripping means which is composed of a form 28 and a mating form 29 pivoting one on the other according to an axis 30 in order to position and grip the pieces 31 which are to be welded.

This positioning and gripping assembly is supported by a frame 32 which is mounted to pivot according to an axis 33 on a support 34. In this example, the frame 32 comprises a plurality of retractable mirrors 35 aligned according to the pivoting axis 33 and which are capable of successively receiving the incident laser beam 36 reflected by a mirror 37 fixed on the support 34 and passing through the axis 33.

In this case likewise, the laser beams are reflected successively by the mirrors 35 and are passed to the welding positions 13 which focus the beams through corresponding cavities provided in the form 28 in order to effect welding of the pieces 31.

In the embodiment shown in FIG. 8, the form 28 is movable in a translatory sense and is supported by a frame 37 which is adapted for movement on slides 38. The aligned retractable mirrors 35 successively receive the laser beam via the intermediary of a mirror 39 rigid with the frame 37 and hence with the form 28, the incident laser beam 40 striking the mirror 37 and then in succession the mirrors 35 when the form 38 is positioning and gripping the pieces to be welded to one another, in conjunction with a mating form.

The installation shown in FIG. 9 is designed for positioning, gripping and welding the two panels 41, 42 of a motor vehicle door, the positioning and gripping tools comprising assemblies referred to as punch 43 and die 44 of which the facing surfaces $43_1$, $44_1$ are designed to correspond to those of the panels 41 and 42 in order to position them and grip them correctly while the punch and die are moving towards each other.

In this example, the punch 43 is fixed and the die 44 is mounted on a table of a mobile press 45 adapted for movement between a high positioning and gripping position (shown by solid lines) and a low position (shown by dotted lines), intended to allow the two panels 41 and 42 to be placed on the press and then to allow removal of the door, the two panels of which are partially or completely welded. When the press is opened, the door panels or the assembled door will be supported by supports 46, 47 integrated into a transfer line.

In the example, the cavities 7 which allows passage of the focused laser beam 48, are provided on the fixed punch 43, this beam originating from a laser beam generator 49, after successive reflections on mirrors 50, 51. 52. The beam is then introduced into welding stations 53 which focus the beam 48 in the welding zones of the two pieces 41 and 42, doing so through corresponding cavities 7, these cavities opening out on the surface $44_1$ at the height of the superposed pieces.

As illustrated in plan view and in greater detail in FIG. 10, the assembly of welding positions 53 is fed by two distribution assemblies $51_1$ and $51_2$ in which are incorporated mirrors 51 which can be orientated in different directions 54 by a computer in order successively to supply the various welding stations 53 distributed over the periphery of the punch 43.

In contrast to FIGS. 9 and 10, FIGS. 11 and 12 show an embodiment of an installation for welding the essential constituent elements of a motor vehicle body.

In this case, the welding station comprises two identical and mobile lateral assemblies 55 (one of them being solely shown in FIG. 7), these assemblies being provided with movable positioning and gripping means such as 56 which together support the various welding heads 57 positioned at the height of the cavities provided in the positioning and gripping means 56.

Associated with each later assembly 55 is one or more laser beam generators and also a plurality of distribution assemblies 58, 59, 60, 61 which send back the laser beams to mirrors 62, each of which is associated with a welding station 57, these mirrors 62 and these distribution assemblies 58, 59, 60, 61 functioning in one of the ways shown in FIGS. 3 to 8.

FIG. 12 shows a detail of the installation in FIG. 11 designed for positioning, gripping and indentation (or welding) of the roof 63 of a vehicle body, to the door frame 64 and a gutter 65.

FIG. 12 shows a pipe 72 through which weld protective gas arrives.

It will be noted that the lateral assembly 55 comprises gripping and positioning means $56_1$, $56_2$, and $56_3$, the gripping members $56_1$ and $56_3$ being movable by pivoting under the action of jacks about axes $56_4$ and $56_5$.

In this FIG. 12, a welding station 57 fixed to the gripping and positioning member $56_1$ has been shown, this welding station 57 producing the laser beam $57_1$ which is focused at $57_2$ through the cavity 7 on the junction of the body parts 63, 64 and 65.

It will be noted that the installation according to the invention entails the provision of assemblies comprising at one and the same time positioning and/or gripping tools and welding tools which are fixed in relation to one another in such a way as to constitute tooling assemblies specific to the welding of definite pieces and for example pieces of motor vehicles bodies.

For example, a station for welding motor vehicle bodywork will comprise lateral working assemblies comprising in each case a plurality of tooling assemblies 56 in order to co-operate jointly in the indentation or welding of pieces of a vehicle body 56.

Likewise, by reason of the conception of the installation according to the invention, a plurality of welding stations 67, 68, 69 can be provided in one and the same production line, each of these stations comprising the above-defined tooling which is specific to the provision of a type of bodywork (different or identical), these positions being incorporated into a single transfer line 70 from which they are fed.

Likewise, as will be noted in FIG. 13, the three welding stations disposed in parallel are supplied by four laser beam generators 71 which direct the laser beam successively at a plurality of distribution stations $71_1$, the distribution stations $71_1$ supplied by one and the same laser beam generator being capable of serving a plurality of welding stations 67, 68, 69.

We claim:

1. A multi-point laser beam welding installation for the assembly of vehicle body pieces comprises:

positioning means for pieces including a punch and a die which are mobile in relation to one another and which are shaped to correspond to at least part of the pieces, vehicle body pieces held between said punch and said die;

said positioning means having a cavity which opens onto the pieces;

means for gripping said pieces being operatively associated with said positioning means;

means for welding including at least one laser beam source for supplying a laser beam and at least one laser beam head fixed to said positioning means, said laser beam welding head comprising means for focusing the laser beam onto the cavity; and means for distributing the laser beam being provided between the laser beam source and said welding head and adpated for succesively orienting the laser beam toward the head, whereby spot welding is successively carried out when the pieces are positioned and gripped.

2. Installation according to claim 1, characterized in that the means for distributing comprises a mirror, said mirror being pivotal under the action of a motor operated by a computer, a target being fixed on the positioning means to constitute a point of reference for the orientation of the beams toward the welding head.

3. Installation according to claim 1 characterized in that the means for distributing includes a plurality of mirrors adapted for movement between two positions and capable of being positioned successively in the axis of the incident laser beam emanating from a laser beam source, so that at a time and in succession the laser beam is carried towards the welding head for the beam, thus carrying out a spot weld.

4. Installation according to claims 2 or 3, characterized in that the positioning means is pivotable and that the mirrors are positioned according to the pivoting axis of the positioning means.

* * * * *